No. 645,819. Patented Mar. 20, 1900.
G. A. LITZENBERGER.
LAND WHEEL ATTACHMENT FOR SULKY PLOWS.
(Application filed Nov. 18, 1899.)
(No Model.)
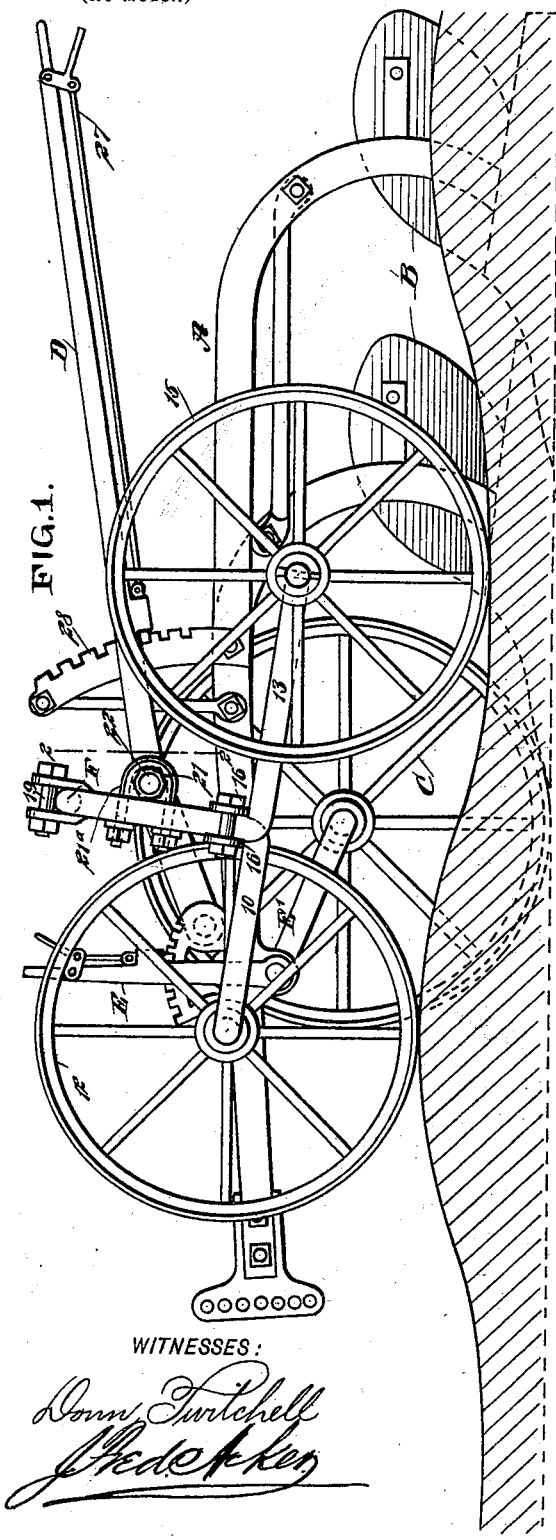
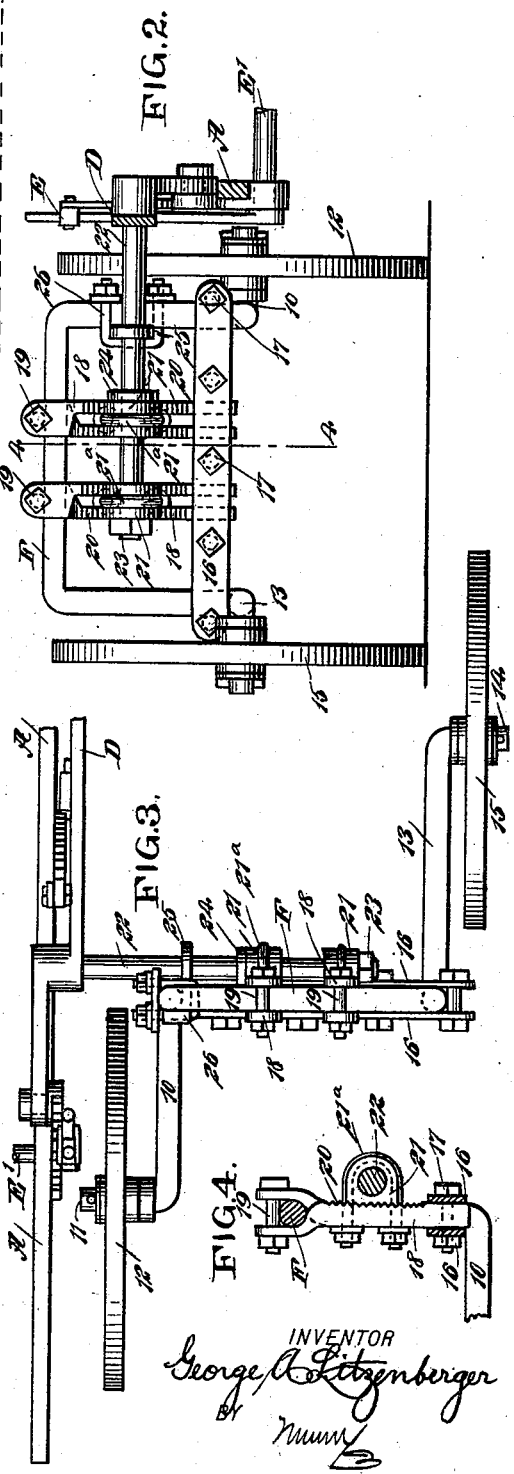
WITNESSES:
INVENTOR
George A. Litzenberger
BY
ATTORNEYS
THE NORRIS PETERS CO., PHOTO-LITHO., WASHINGTON, D. C.

UNITED STATES PATENT OFFICE.

GEORGE ARTHUR LITZENBERGER, OF SUNBEAM, ILLINOIS.

LAND-WHEEL ATTACHMENT FOR SULKY-PLOWS.

SPECIFICATION forming part of Letters Patent No. 645,819, dated March 20, 1900.

Application filed November 18, 1899. Serial No. 737,484. (No model.)

*To all whom it may concern:*

Be it known that I, GEORGE ARTHUR LITZENBERGER, a citizen of the United States, residing at Sunbeam, in the county of Mercer and State of Illinois, have invented a new and Improved Land-Wheel Attachment for Sulky-Plows, of which the following is a full, clear, and exact description.

The object of my invention is to provide a means for connecting two land-wheels to a mounted or sulky plow or like machine and to so effect the attachment that the position of the plowshares will not be changed relative to the ground when the land-wheels travel over an undulating surface, enabling the implement to work perfectly either crosswise or lengthwise with the ridges and hollows of corn rows.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of a wheeled or sulky plow having the attachment applied thereto. Fig. 2 is a section taken practically on the line 2 2 of Fig. 1, showing the attachment in rear elevation. Fig. 3 is a plan view of the attachment and a portion of the beam of the plow, and Fig. 4 is a vertical section taken substantially on the line 4 4 of Fig. 2.

A represents the beam of a sulky-plow; B, the plowshares; C, the wheel connected with the beam and adapted to travel in the furrow.

D represents a lever fulcrumed upon the beam or any portion of a frame carried by the beam, and E represents a lever adapted for adjusting the arched axle E', upon which the furrow-wheel C is mounted.

In the drawings I have illustrated the attachment as connected with the lever D, by means of which the land-wheels and their connecting-frame may be raised and lowered; but I desire it to be understood that the attachment may be made in any other suitable manner.

The attachment, which is shown in detail in Figs. 2, 3, and 4, consists of an arched frame F, and an arm 10 is horizontally carried in a forward direction from one of the lower portions of the said frame F, the arm 10 being provided with a spindle 11 at right angles to the said arm, and upon which spindle one of the land-wheels 12 is mounted to turn. At the lower portion of the opposite side of the frame F a rearwardly-extending arm 13 is provided, having a spindle 14 integral therewith, and on this spindle a second land-wheel 15 is mounted to turn. Under this arrangement it will be observed that one land-wheel is in advance of the other and that one land-wheel is diagonally opposite to the other.

Parallel bars 16 extend from side to side of the frame F at or near its bottom, being connected by means of bolts 17 or their equivalents, and the lower ends of uprights 18 are made to enter the space between the said cross-bars 16, while the upper portions of said uprights engage with the upper or horizontal member of the frame F. These uprights are located one at each side of the center of the frame F and are arranged in pairs. While the lower end of each upright of a pair enters the space between the cross-bars 16, as above stated, one upright of a pair is carried to the front of the upper member of the frame F and the other upright of a pair is made to engage with the rear of the said upper member of the frame, as is shown best in Fig. 4. The uprights 18 are held in position by passing suitable bolts 19 through their upper ends and over the upper member of the frame F. Transverse teeth 20 are produced in the rear faces of the uprights 18, as shown in Figs. 2 and 4, and boxes 21 are made to engage with the toothed or serrated surfaces of the said uprights 18, as illustrated in Figs. 2 and 3, the boxes being held in position by means of suitable clips or clamps 21ª. Therefore these boxes 21 are readily adjusted on the uprights. A shaft 22 is mounted to turn in the said boxes 21, and the outer end of the shaft is provided with a nut 23 or the equivalent thereof, engaging with the outer side surface of the outer pair of uprights, preventing the shaft 22 from having end movement in direction of the machine to which the attachment is to be applied. The shaft is prevented from having end movement in the opposite direction by securing a collar 24 on the shaft 22 so that it will engage with the inner side face of the inner pair of uprights 18, as is also shown in Fig. 2. The shaft 22 is further supported by a bearing 25, and this bearing is secured to the inner vertical member of the frame F through the medium of a clip or clamp 26, as shown in Figs. 2 and 3.

Under the arrangement shown in the drawings the shaft 22 is journaled at its inner end to an offset on the lever D, and the said shaft 22 may consequently be raised and lowered by the manipulation of the lever D, which is provided with a thumb-latch 27, arranged for engagement with a rack 28, carried by the plow-beam A. As the shaft 22 turns freely on the frame F, the forward or rear land-wheels 12 and 15 may rise and fall, accommodating themselves to the inequalities of the ground without changing the position of the shaft 22, and consequently without disturbing the position of the shares B relative to the ground.

It will be observed that the uprights or standards 18 are adjustable on the body portion of the frame F and that they may be moved any desired distance to and from the vertical center of the body of the frame.

Having thus described my invention, I claim as new and desire to secure by Letters Patent—

1. A land-wheel attachment for sulky-plows, consisting of a frame having arms extending in opposite directions from opposite ends, wheels carried by the said arms, and a shaft arranged longitudinally of the frame and upon which the frame is loosely mounted, said shaft being adapted for connection with a plow or other implement to which the attachment is to be made.

2. In a land-wheel attachment for sulky-plows, an arched frame provided with horizontal arms, one of the said arms extending forwardly from the lower portion of a vertical member of the frame, the other arm extending horizontally rearward from the opposing vertical member of the frame, spindles carried by the said arms, wheels mounted on the said spindles, uprights carried by the frame, boxes adjustable upon the uprights, and a shaft mounted in the said boxes and upon which the frame swings, as described.

3. In a land-wheel attachment for sulky-plows and like machines, an arched frame, arms extending in opposite directions from the lower portions of the vertical members of the said frame, wheels carried by the said arms, adjustable standards carried by the body portion of the said frame, boxes adjustable on the said standards, a shaft mounted in the said boxes and upon which the frame swings, and means for connecting the said shaft with the plow or other implement, as set forth.

4. In a land-wheel attachment for sulky-plows, the combination with a wheeled frame having top and bottom bars, the wheels of said frame being arranged one in advance of the other, of uprights secured to the frame, boxes adjustably secured to the uprights, and a shaft mounted in the boxes and upon which the frame is free to swing, substantially as described.

5. In a land-wheel attachment for sulky-plows, the combination of an arched frame having wheel-carrying arms extending in opposite directions from the vertical end members of the frame, parallel bars secured to the lower ends of the vertical members of the frame, uprights, secured to the horizontal member of the frame, each upright consisting of two bars, the upper end of one bar extending in front of the said horizontal bar of the frame and the other in rear of the same, the said bars being provided with teeth on one face, boxes engaging the teeth of the bars of the uprights, clips securing the boxes to the uprights, and a shaft mounted in the boxes and upon which the frame swings, substantially as described.

In testimony whereof I have signed my name to this specification in the presence of two subscribing witnesses.

GEORGE ARTHUR LITZENBERGER.

Witnesses:
 JOHN G. SEXTEN,
 W. T. CHURCH.